UNITED STATES PATENT OFFICE.

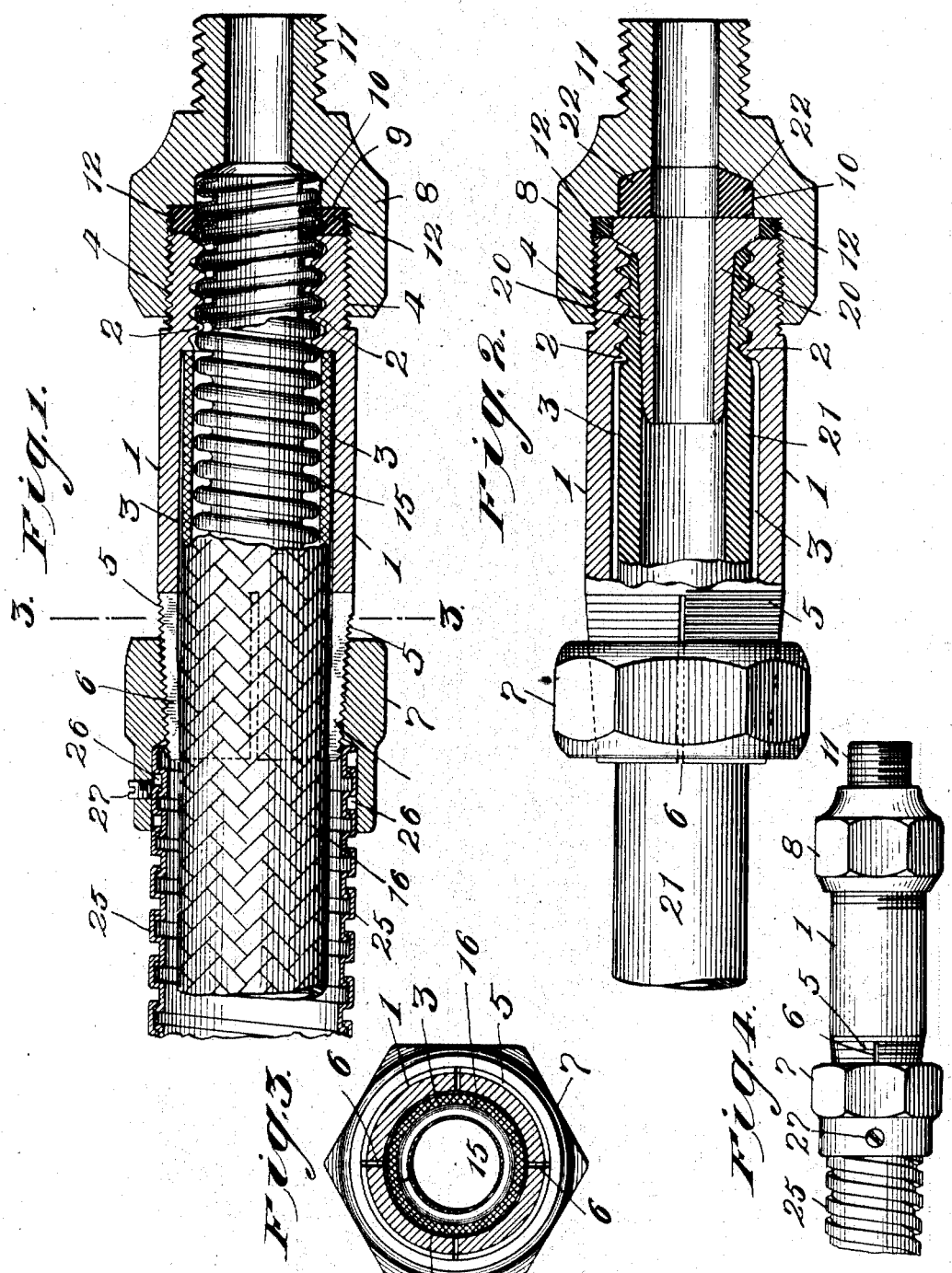

SAMUEL LEVITT, OF BROOKLYN, NEW YORK, ASSIGNOR TO UNITED METAL HOSE COMPANY, INC., OF NEW YORK, N. Y., A CORPORATION OF NEW YORK.

PIPE CONNECTION.

1,315,784.

Specification of Letters Patent. Patented Sept. 9, 1919.

Application filed May 3, 1919. Serial No. 294,365.

*To all whom it may concern:*

Be it known that I, SAMUEL LEVITT, a citizen of Russia, residing in the borough of Brooklyn, city of New York, county of Kings, and State of New York, have invented certain new and useful Improvements in Pipe Connections, of which the following is a specification.

This invention relates to a pipe connection or coupling adapted to be attached to the end of a flexible pipe or hose for connecting the same to another pipe section, or to whatever the flexible pipe is to be connected. My improved coupling is especially adapted for use in connection with covered flexible metal tubing, in which case provision is made for a tightly sealed joint with the inner member of the tubing, and also for the proper reception of the end portion of the armor or covering. My coupling may also be used however, with uncovered metal tubing or with flexible tubing of rubber or the like, either covered or uncovered.

In the accompanying drawings, which form a part of this specification, and which illustrate one preferred form of the invention, Figure 1 is a longitudinal sectional view showing such form applied to a flexible metal tube;

Fig. 2 is a similar view showing the coupling applied to a rubber hose;

Fig. 3 is a cross section on line 3—3 of Fig. 1.

Fig. 4 is an outside view of the assembly shown in Fig. 1.

Referring to the drawings in detail, the coupling in its preferred form comprises a metal sleeve 1, internally threaded for a part of its length, as indicated at 2, and having an enlarged cylindrical bore 3 extending from its rear end throughout a considerable part of the length of the sleeve. At that end of the sleeve which is internally threaded an external thread 4 is provided, while the other end of the sleeve is provided with an externally threaded, tapered portion 5. This tapered threaded portion of the sleeve is preferably split at a plurality of points, as indicated at 6, so as to permit this part of the sleeve to be compressed somewhat by the action of a clamping nut 7 screwing on the tapered thread. Adapted to screw on the threaded portion 4 on the front end of the sleeve, is a coupling nut 8, having an internal shoulder 9 intermediate of its length, and having a bore 10 of sufficient diameter to receive the inner end of the metal tube with which the coupling is adapted to be used. The front end of the coupling nut is provided with an externally threaded spigot connection 11 or is otherwise suitably formed for connection with any desired duct member or the like. A soft packing 12 of asbestos, rubber or other suitable material is provided between the end of the sleeve 1, and the shoulder 9 of the coupling nut, between which surfaces it is adapted to be compressed when the nut is screwed on the sleeve.

Figs. 1 and 3 show the application of the coupling to an armored or sheathed flexible metal tube 15. The tube which is illustrated as a seamless thin metal tube having a spiral corrugation to give flexibility, although it will be understood that the coupling may be used with any other type of tube, such as a tube formed of spirally wound strips, in any well known manner. The tube 15 is shown as provided with a cover, sheath or armor 16 which is illustrated as formed of braided metallic strips or wires, although, as will be understood, the coupling may be used with a tube having any other suitable form of covering. When utilized with a tubing of the character described, the covering is cut off somewhat shorter than the inner metallic tubing and the sleeve 1 is slipped over the end of the tubing, the covering being received within the bore 3 while the threads 2 are screwed on the spiral corrugations of the inner tube. The coupling nut 8 is screwed firmly on the threaded portion 4 of the sleeve and compresses the soft packing 12 against the inner tube and into the corrugations thereof, so as to form a tightly sealed joint which effectually prevents leakage. The nut 7 is screwed up so as to compress the rear split portion of the sleeve tightly upon the casing or armor, thereby holding the latter firmly in place, and forming a good finish, without requiring the use of solder. It will thus be seen that the coupling may be very readily attached in the manner above described, and that a firm and tight connection with both the inner tube and the casing may be established quickly and without the necessity of performing any soldering or other difficult operation.

In Fig. 2 I have shown the application of the coupling to a hose of rubber or other flexible material. When the coupling is applied to such a hose a thimble 20 is used in connection with it, which is slightly tapered on the outside and is forced into the end of the hose 21. The sleeve 1 is first slipped over the end of the hose and the threaded portion 2 engaged therewith, after which the thimble is forced in, thus compressing the rubber or flexible material into the threads. The thimble is then held in place by the application of the clamping nut 8, which also compresses the packing 12. A packing 22 is preferably placed in the bore 10 of the clamping nut and is compressed against the end of the thimble. In some cases the packing 12 may be omitted. The split end of the sleeve is preferably drawn up close against the outer surface of the hose by the action of the nut 7, as already described.

In some cases it is desirable to attach to the coupling an additional armoring or reinforcing member adapted to protect the tubing against being bent too sharply with resultant breakage or injury.

In Figs. 1 and 4 I have shown such reinforcement in the form of a short section of spirally wound flexible tubing 25, one end of which is secured to the coupling by being inserted in a bore 26, formed for the purpose, in the rear part of the clamping nut 7. Any suitable means for securing the reinforcement to the clamping nut may be employed, such, for instance, as the set screw 27.

While I have described only one preferred form of my invention, it is to be understood that the invention is not limited to such precise form, but is capable of modification. I do not, therefore, intend the appended claims to be limited to the form illustrated, any further than as particularly described therein, but I intend to cover my invention broadly in whatever form its principle may be embodied.

Having thus described my invention, I claim:—

1. A coupling of the character described comprising a sleeve having a portion adapted to receive and engage a metal tube, and having an enlarged bore formed therein in rear of said tube-engaging portion, said sleeve being externally threaded at its forward end, a coupling nut adapted to screw on said externally threaded portion, and having an internal shoulder therein, and a packing adapted to be compressed between the forward end of the sleeve and said shoulder.

2. A coupling of the character described comprising a sleeve having a portion adapted to receive and engage a metal tube, and having an enlarged bore formed therein in rear of said tube-engaging portion, said sleeve being externally threaded at its forward end, a coupling nut adapted to screw on said externally threaded portion, and having internal shoulders therein, and a packing adapted to be compressed between the forward end of the sleeve and said shoulder, the rear end of the sleeve being split and provided with a tapered external thread and a clamping nut screwing on said thread.

3. A coupling of the character described comprising a sleeve having an internal thread at the forward end thereof, and a substantially cylindrical bore of larger diameter in rear of said threaded portion, the forward end of said sleeve being externally threaded, a coupling nut screwing on said external thread on the sleeve, and having an inwardly extending shoulder, and a packing interposed between the forward end of the sleeve and said shoulder and adapted to be compressed therebetween when the nut is screwed up on the sleeve.

4. In a coupling of the character described a sleeve having a coarse internal thread extending throughout part of its length and having a substantially cylindrical bore of enlarged diameter in rear of said thread, a coupling nut adapted to be engaged with one end of said sleeve, the other end of said sleeve being split and provided with an external tapered thread, and a clamping nut screwing on said thread.

5. The combination with a metallic tubing comprising a helically ribbed inner tube having a sheath thereon terminating short of the end of the inner tube, and a coupling attached to said tubing, comprising a sleeve having an internally threaded portion screwed on the projecting end of the inner tube and having a rearwardly extending portion provided with a substantially cylindrical bore in which a part of the sheath is received, the rear end of the sleeve being split and being externally threaded, a clamping nut screwing on said rear threaded end of the sleeve and acting to compress the same against the outer surface of the sheath, the opposite end of said sleeve being externally threaded, and a coupling nut screwing on said threaded part of the sleeve, said coupling nut having an internal shoulder and having a bore extending forwardly of said shoulder into which the end of the inner tube is adapted to be received, and a packing interposed between the forward end of said sleeve and the shoulder in said coupling nut, and adapted to be compressed between said surfaces into engagement with the outer surface of the inner tube when the coupling nut is screwed up on the sleeve.

6. In a coupling of the character described, a sleeve having a bore adapted to receive the end of a flexible tube, the rear end of said sleeve having a nut in screw-threaded engagement therewith, said nut having a bore in the rear part thereof, and a flexible reinforcing tube having one end secured in said bore.

7. In a coupling of the character described, a sleeve having a bore adapted to receive the end of a flexible tube, the rear end of said sleeve being split and provided with an external thread, a clamping nut screwed on said thread, said clamping nut having a bore in the rear part thereof, and a flexible reinforcing tube having one end secured in said bore.

SAMUEL LEVITT.